United States Patent
Susnjara et al.

(10) Patent No.: US 10,744,709 B2
(45) Date of Patent: Aug. 18, 2020

(54) METHODS AND APPARATUS FOR COMPRESSING MATERIAL DURING ADDITIVE MANUFACTURING

(71) Applicant: Thermwood Corporation, Dale, IN (US)

(72) Inventors: Kenneth J. Susnjara, Birdseye, IN (US); Scott G. Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/572,897

(22) Filed: Sep. 17, 2019

(65) Prior Publication Data

US 2020/0061905 A1 Feb. 27, 2020

Related U.S. Application Data

(62) Division of application No. 15/435,408, filed on Feb. 17, 2017, now Pat. No. 10,449,710.

(51) Int. Cl.

| | | |
|---|---|---|
| *B29C 67/00* | (2017.01) | |
| *B29C 64/106* | (2017.01) | |
| *B29C 64/194* | (2017.01) | |
| *B29C 64/218* | (2017.01) | |
| *B33Y 10/00* | (2015.01) | |
| *B33Y 30/00* | (2015.01) | |
| *B33Y 40/00* | (2020.01) | |

(52) U.S. Cl.
CPC .......... *B29C 64/106* (2017.08); *B29C 64/194* (2017.08); *B29C 64/218* (2017.08); *B33Y 10/00* (2014.12); *B33Y 30/00* (2014.12); *B33Y 40/00* (2014.12)

(58) Field of Classification Search
CPC .................................................. B29C 64/218
See application file for complete search history.

(56) References Cited

U.S. PATENT DOCUMENTS

| | | | |
|---|---|---|---|
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 2005/0218552 A1* | 10/2005 | Van Erden | B29C 55/06 264/175 |
| 2007/0044899 A1 | 3/2007 | Tingley | |
| 2008/0006017 A1 | 1/2008 | Rindels | |
| 2008/0303182 A1 | 12/2008 | Breyer | |

(Continued)

*Primary Examiner* — Joseph A Miller, Jr.
(74) *Attorney, Agent, or Firm* — Bookoff McAndrews, PLLC

(57) ABSTRACT

An additive manufacturing device and method for delivering a flowable material from a nozzle of a programmable computer numeric control (CNC) machine, and compressing the flowable material with a compression roller. In one embodiment, the device includes a nozzle configured to deposit a flowable material on a surface; and a roller configured to compress the deposited flowable material, wherein the roller comprises: a flat center portion having a constant diameter; and opposed end portions, wherein each end portion extends outwardly from the flat center portion, and wherein a radially outermost surface of each end portion is angled relative a rotational axis of the roller.

20 Claims, 6 Drawing Sheets

(56) References Cited

U.S. PATENT DOCUMENTS

| | | | |
|---|---|---|---|
| 2009/0014116 A1* | 1/2009 | Takada | B29C 43/28 |
| | | | 156/209 |
| 2010/0109185 A1 | 5/2010 | Ogawa et al. | |
| 2010/0200168 A1 | 8/2010 | Oldani et al. | |
| 2013/0081751 A1* | 4/2013 | Kokaji | B32B 37/0046 |
| | | | 156/64 |
| 2018/0050502 A1 | 2/2018 | Oldani | |

* cited by examiner

METHODS AND APPARATUS FOR COMPRESSING MATERIAL DURING ADDITIVE MANUFACTURING

CROSS-REFERENCE TO RELATED APPLICATION(S)

This patent application is a divisional of U.S. patent application Ser. No. 15/435,408, filed on Feb. 17, 2017, the entirety of which is incorporated herein by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer-aided design (CAD) model.

One such process, commonly referred to as Fused Deposition Modeling (FDM), comprises a process of melting a very thin layer of a flowable material (e.g., a thermoplastic material), and applying this material in layers to produce a final part. This is commonly accomplished by passing a continuous thin filament of thermoplastic material through a heated nozzle, which melts the thermoplastic material and applies it to the structure being printed. The heated material then is applied to the existing structure in thin layers, melting and fusing with the existing material to produce a solid finished product.

A common method of additive manufacturing, or 3D printing, generally includes forming and extruding a bead of flowable material (e.g., molten thermoplastic), applying the bead of material in a strata of layers to form a facsimile of an article, and machining such facsimile to produce an end product. Such a process is generally achieved by means of an extruder mounted on a computer numeric controlled (CNC) machine with controlled motion along at least the X, Y, and Z-axes. In some cases, the flowable material, such as, e.g., molten thermoplastic material, may be infused with a reinforcing material (e.g., strands of fiber) to enhance the material's strength.

The flowable material, while generally hot and pliable, may be deposited upon a substrate (e.g., a mold), pressed down or otherwise flattened to some extent, and leveled to a consistent thickness, preferably by means of a tangentially compensated roller mechanism. The flattening process may aid in fusing a new layer of the flowable material to the previously deposited layer of the flowable material. In some instances, an oscillating plate may be used to flatten the bead of flowable material to a desired thickness, thus effecting fusion to the previously deposited layer of flowable material. The deposition process may be repeated so that each successive layer of flowable material is deposited upon an existing layer to build up and manufacture a desired component structure. When executed properly, the new layer of flowable material may be deposited at a temperature sufficient enough to allow a new layer of such material to melt and fuse with a previously deposited layer, thus producing a solid part.

The process of 3D-printing a part, which utilizes a large print bead to achieve an accurate final size and shape, requires a two-step process. This two-step process, commonly referred to as near-net-shape, begins by printing a part to a size slightly larger than needed, then machining, milling or routing the part to the final size and shape. The additional time required to trim the part to final size is more than compensated for by the much faster printing process.

In the practice of the aforementioned process, a major deficiency has been noted. In creating parts with successive layers, the layers must be applied in uniform, smooth beads with no trapped air between layers. In applying a successive layer of material upon an existing layer, the existing layer must be leveled smoothly in order to effectively bond with the successive layer. The successive layer of material has to be leveled smoothly and trapped air must be pressed out between the layers. The layers must be of uniform width, height, and shape, in order to produce consistent parts. Also, the flattening device must be able to navigate corners without gouging in, or dragging the flowable material. Smooth layers allow for better bonding between layers, resulting in better strength characteristics in the finished part. Uniform layers allow for consistent bonding of layers, plus less machining time in order to get a smooth part. Air in or between layers can cause voids in the part when machined, which can weaken the bond, and render the part unusable.

In past attempts to address the aforementioned concerns, a number of different methods have been attempted. One such attempted method involves the use of an oscillating plate for tamping the bead to achieve both leveling and bonding. Such a device, however, does not create a smooth bead of uniform width, and therefore requires extra machining, among other problems. While the use of a roller is the preferred method for achieving a smooth and well-bonded strata of layers, attempts by the prior art to employ such a method have resulted in unsatisfactory results.

Another method that has been employed is the use of a grooved roller. A grooved roller, however, does not create a smooth bead, nor does it remove the trapped air between the layers. Attempts to employ a smooth, straight roller have been met with some success; however this method has likewise given rise to unsatisfactory results. The desired compression roller must be somewhat wider than the final compressed surface of the deposited layer that it is flattening. This is due to a number of factors intrinsic to the process, including coverage requirements when negotiating curves and corners in the deposition process.

Another inherent characteristic of the additive manufacturing process is the slight decompression of the deposited layer, which occurs immediately after the compression roller passes over the bead of molten material. Such action results in the surface of the final flattened layer rising up, and remaining slightly higher than the bottom of the compression roller. When an applicator head rotates to execute a change in tool-path direction, the edges, as well as the outer regions of the roller tend to engage the surface of the final flattened layer, since it is slightly higher than the bottom of the roller, resulting in the roller gouging and dragging the deposited material during the transition. A similar problem occurs when depositing a layer adjacent to a previously deposited layer. In such a case, the existing layer is again, slightly higher than the bottom of the roller, the result of which is the same type of problem encountered during directional transition. It is therefore desirable to provide a compression roller of a design that will eliminate, or greatly mitigate the negative aspects of a typical, straight cylindrical roller.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects. In one aspect, the disclosure describes, among other things, a compression roller that can flatten and level layers of molten material in the additive manufacturing process, without gouging into, or dragging the previously-deposited material.

The description below provides a compression roller with a flat center portion for engaging and flattening the deposited bead, with the outer extremities of said roller gradually tapering to the ends in a slight elliptical curve. The flat surface of such a roller provides smooth compression and bonding of the deposited material layer, while the gradually-curved outer surface facilitates destruction-free tracking along curved portions of the deposited layer, as well as during directional changes in the tool path.

In one example, the additive manufacturing device comprises a nozzle configured to deposit a flowable material on a surface; and a roller configured to compress the deposited flowable material, wherein the roller comprises: a flat center portion having a constant diameter; and opposed end portions, wherein each end portion extends outwardly from the flat center portion, and wherein a radially outermost surface of each end portion is angled relative a rotational axis of the roller.

In another example, the additive manufacturing device comprises a nozzle configured to deposit a flowable material; and a roller configured to compress the deposited flowable material, wherein the roller comprises: a cylindrical center portion having a first diameter; and opposed first and second end portions having second and third diameters respectively, wherein the first and second end portions extend from the center portion, and wherein the first diameter is greater than the second and third diameters.

In another aspect, the present disclosure is directed to an additive manufacturing method for compressing a flowable material with a compression roller. In one embodiment, the method comprising depositing a layer of a flowable material on to a surface; and compressing the layer of the flowable material with a roller, wherein the roller comprises: a flat center portion having a constant diameter; and opposed end portions, wherein each end portion extends outwardly from the center portion, and wherein a radially outermost surface of each end portion is angled relative a rotational axis of the roller.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAIL DESCRIPTION OF THE INVENTION

The present disclosure is drawn to, among other things, methods and apparatus for fabricating multiple components via additive manufacturing techniques, such as, e.g., 3D printing. More particularly, the methods and apparatus described herein comprise a method and apparatus for eliminating, or otherwise substantially reducing damage to the surface of deposited and compressed molten material bead(s) during the stratification process of additive manufacturing by, e.g., providing a compression roller that can flatten and level layers of molten material in the additive manufacturing process, without gouging into, or dragging the previously-deposited material.

For purposes of brevity, the methods and apparatus described herein will be discussed in connection with fabricating parts from thermoplastic materials. However, those of ordinary skill in the art will readily recognize that the disclosed apparatus and methods may be used with any flowable material suitable for additive manufacturing, such as, e.g., 3D printing.

In one aspect, the present disclosure is directed to an extruder-based 3D printing head including a compression roller having a shape that facilitates compressing a bead of flowable material (e.g., a thermoplastic material) by eliminating distortion of the layered and compressed surface.

Figure 1:
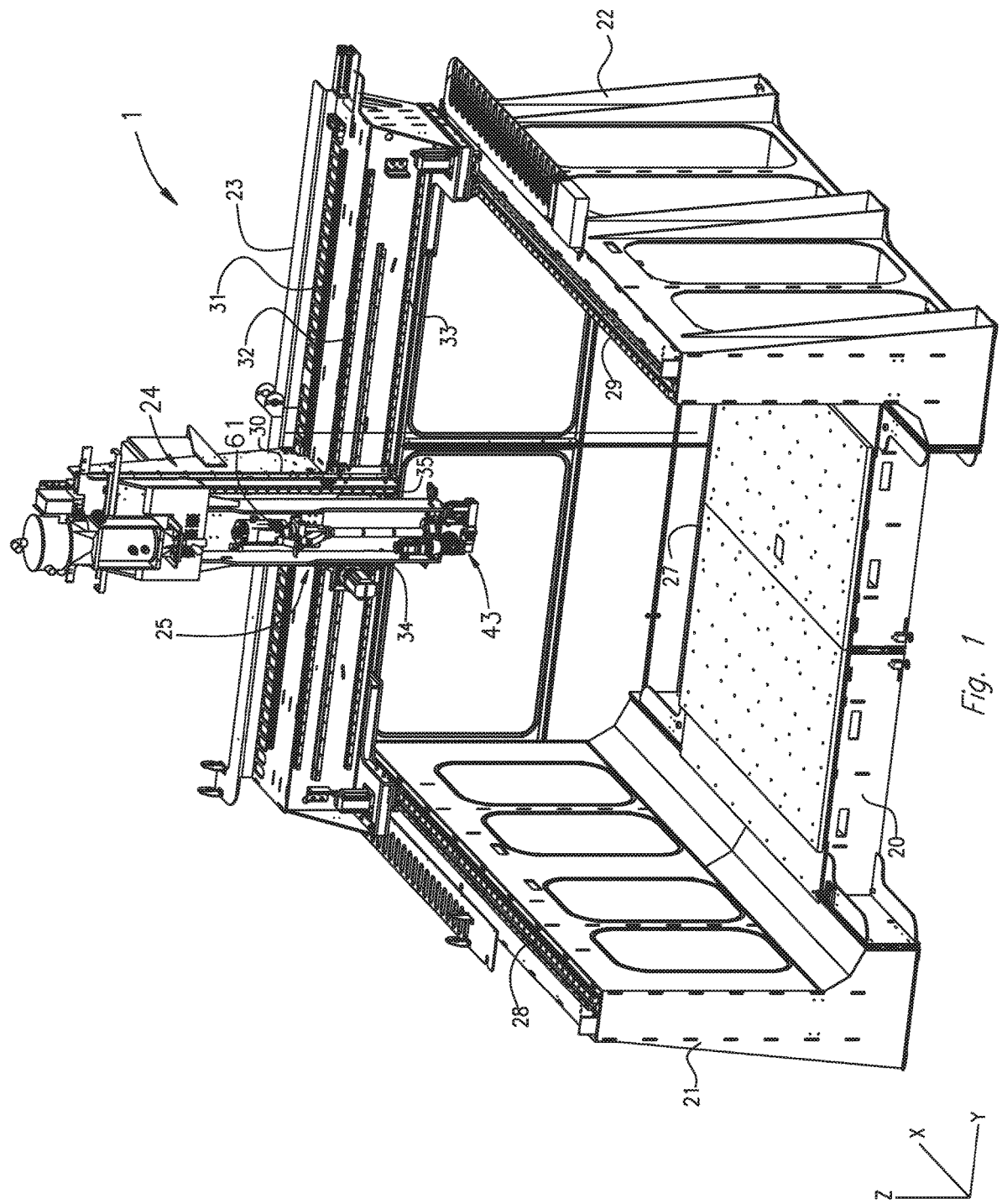
FIG. 1 is a perspective view of an exemplary CNC machine operable pursuant to an additive manufacturing process to form articles, according to an aspect of the present disclosure.

With reference now to FIG. 1 of the drawings, there is illustrated a programmable computer numeric control (CNC) machine 1 embodying aspects of the present disclosure. A controller (not shown) may be operatively connected to machine 1 for displacing an application nozzle along a longitudinal line of travel or x-axis, a transverse line of travel or a y-axis, and a vertical line of travel or z-axis, in accordance with a program inputted or loaded into the controller for performing an additive manufacturing process to replicate a desired component. CNC machine 1 may be configured to print or otherwise build 3D parts from digital representations of the 3D parts (e.g., AMF and STL format files) programmed into the controller. For example, in an extrusion-based additive manufacturing system, a 3D part may be printed from a digital representation of the 3D part in a layer-by-layer manner by extruding a flowable material. The flowable material may be extruded through an extrusion tip carried by a print head of the system, and is deposited as a sequence of beads or layers on a substrate in an x-y plane. The extruded flowable material may fuse to previously deposited material, and may solidify upon a drop in temperature. The position of the print head relative to the substrate is then incrementally advanced along a z-axis (perpendicular to the x-y plane), and the process is then repeated to form a 3D part resembling the digital representation.

Machine 1 includes a bed 20 provided with a pair of transversely spaced side walls 21 and 22, a gantry 23 supported on side walls 21 and 22, carriage 24 mounted on gantry 23, a carrier 25 mounted on carriage 24, an extruder 61, and an applicator assembly 43 mounted on carrier 25. Supported on bed 20 between side walls 21 and 22 is a worktable 27 provided with a support surface disposed in an x-y plane, which may be fixed or displaceable along an x-axis. In the displaceable version, the worktable may be displaceable along a set of rails mounted on the bed 20 by means of servomotors and rails 28 and 29 mounted on the bed 20 and operatively connected to the worktable 27. Gantry 23 is disposed along a y-axis, supported at the ends thereof on end walls 21 and 22, either fixedly or displaceably along an x-axis on a set of guide rails 28 and 29 provided on the upper ends of side walls 21 and 22. In the displaceable version, the gantry 23 may be displaceable by a set of servomotors mounted on the gantry 23 and operatively connected to tracks provided on the side walls 21 and 22 of the bed 20. Carriage 24 is supported on gantry 23 and is provided with a support member 30 mounted on and displaceable along one or more guide rails 31, 32 and 33 provided on the gantry 23. Carriage 24 may be displaceable along a y-axis on one or more guide rails 31, 32 and 33 by a servomotor mounted on the gantry 23 and operatively connected to support member 30. Carrier 25 is mounted on a set of spaced, vertically disposed guide rails 34 and 35 supported on the carriage 24 for displacement of the carrier 25 relative to the carriage 24 along a z-axis. Carrier 25 may be displaceable along the z-axis by a servomotor mounted on the carriage 24 and operatively connected to the carrier 25.

Figure 2:
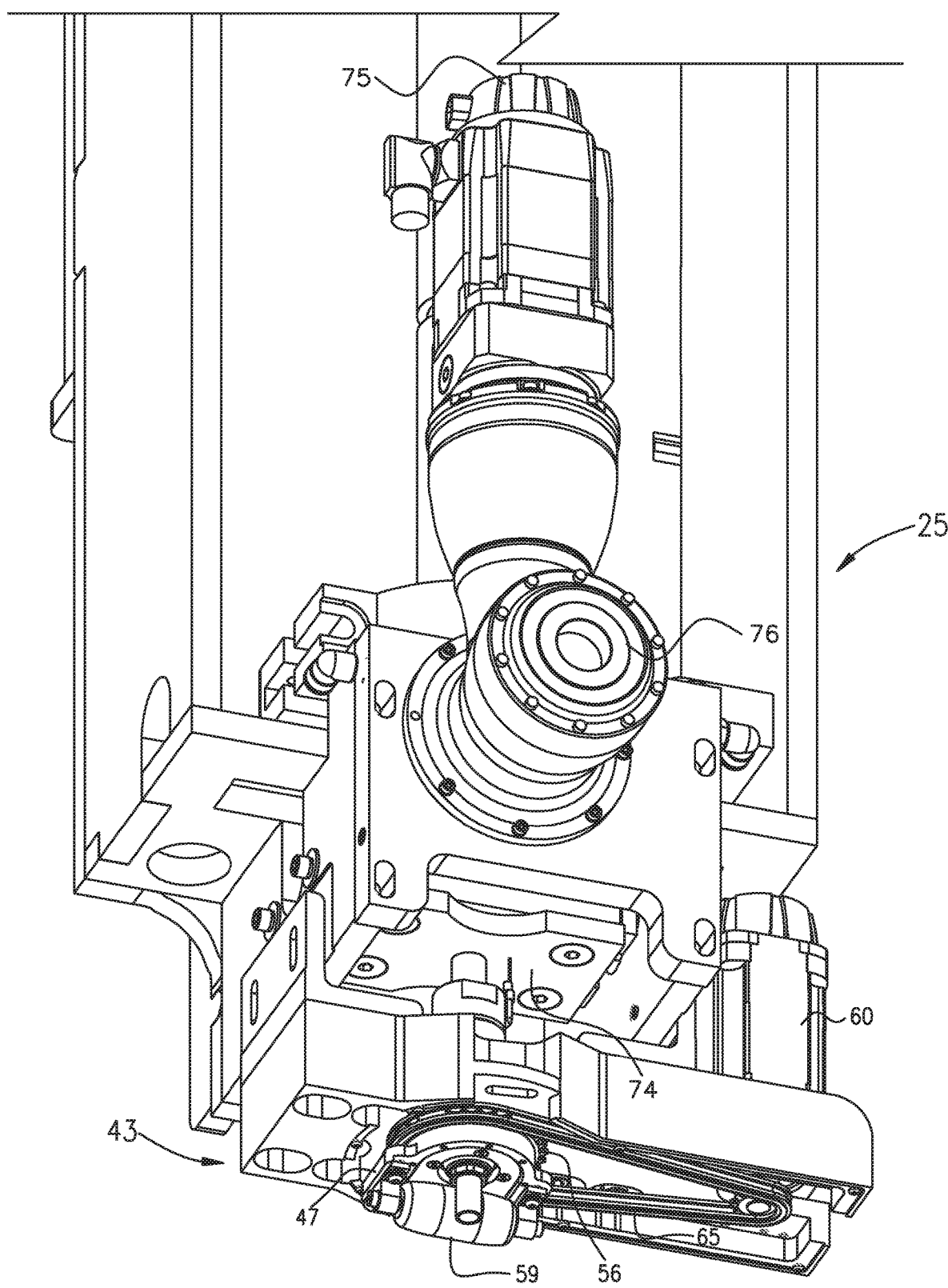
FIG. 2 is an enlarged perspective view of an exemplary carrier and applicator assembly of the exemplary CNC machine shown in FIG. 1.
Figure 3:
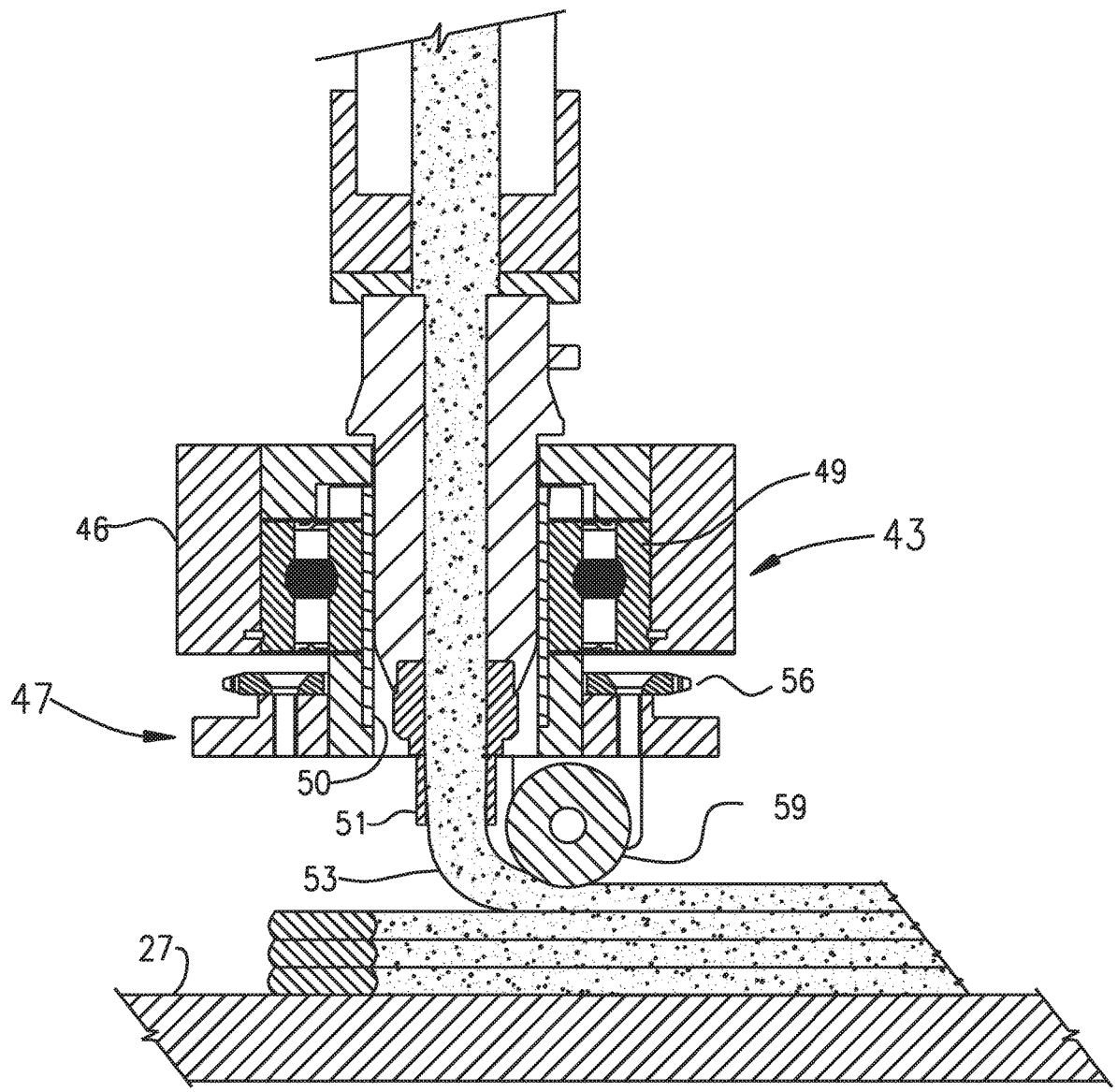
FIG. 3 is an enlarged cross-sectional view of an exemplary applicator head assembly shown in FIG. 2.

As best shown in FIG. 2, fixedly mount to carrier 25 is a positive displacement gear pump 74, driven by a servomotor 75, through a gearbox 76. Gear pump 74 receives molten plastic from extruder 61 shown in FIG. 1. As shown in FIG. 2, a tangentially compensated bead-shaping compression roller 59, rotatably mounted in carrier bracket 47, provides a means for flattening and leveling a bead of flowable material (e.g., a thermoplastic material), as also shown in FIG. 3. Carrier bracket 47 may be adapted to be rotationally displaced by means of a servomotor 60, as shown in FIG. 2), through a sprocket 56 and drive-chain 65 arrangement.

With continuing reference to FIG. 3, applicator head 43 may include a housing 46 with a roller bearing 49 mounted therein. Carrier bracket 47 is fixedly mounted to an adaptor sleeve 50, journaled in bearing 49. As best shown in FIGS. 2-3, a bead of a flowable material (e.g., a thermoplastic material) under pressure from a source (e.g., one or more extruder 61 and an associated polymer or gear pump) disposed on carrier 25, to applicator head 43, may be fixedly (or removably) connected to, and in communication with nozzle 51. In use, the flowable material 53 (e.g., melted thermoplastic) may be heated sufficiently to form a molten bead thereof, delivered through applicator nozzle 51, to form uniform, smooth multiple rows of deposited material free of trapped air on to surface 27. Such beads of molten material may be flattened, leveled, and/or fused to adjoining layers by bead-shaping compression roller 59, to form an article. Even though compression roller 59 is depicted as being integral with application head 43, compression roller 59 may be separate and discrete from applicator head 43.

In some embodiments, the deposited material 53 may be provided with a suitable reinforcing material, such as, e.g., fibers that facilitate and enhance the fusion of adjacent layers of extruded flowable material 53.

In some embodiments, machine 1 may include a velocimetry assembly (or multiple velocimetry assemblies) configured to determine flow rates (e.g., velocities and/or volumetric flow rates) of material 53 being delivered from applicator head 43. The velocimetry assembly preferably transmits signals relating to the determined flow rates to the aforementioned controller coupled to machine 1, which may then utilize the received information to compensate for variations in the material flow rates.

In the course of fabricating a component, pursuant to the methods described herein, the control system of the machine 1, in executing the inputted program, may control several servomotors described above to displace the gantry 23 along the x-axis, displace the carriage 24 along the y-axis, displace the carrier 25 along a z-axis, and rotates bracket 47 about a z-axis while compression roller 59 forms uniform, smooth rows of deposited material 52 free of trapped air to create an article.

Figure 4:
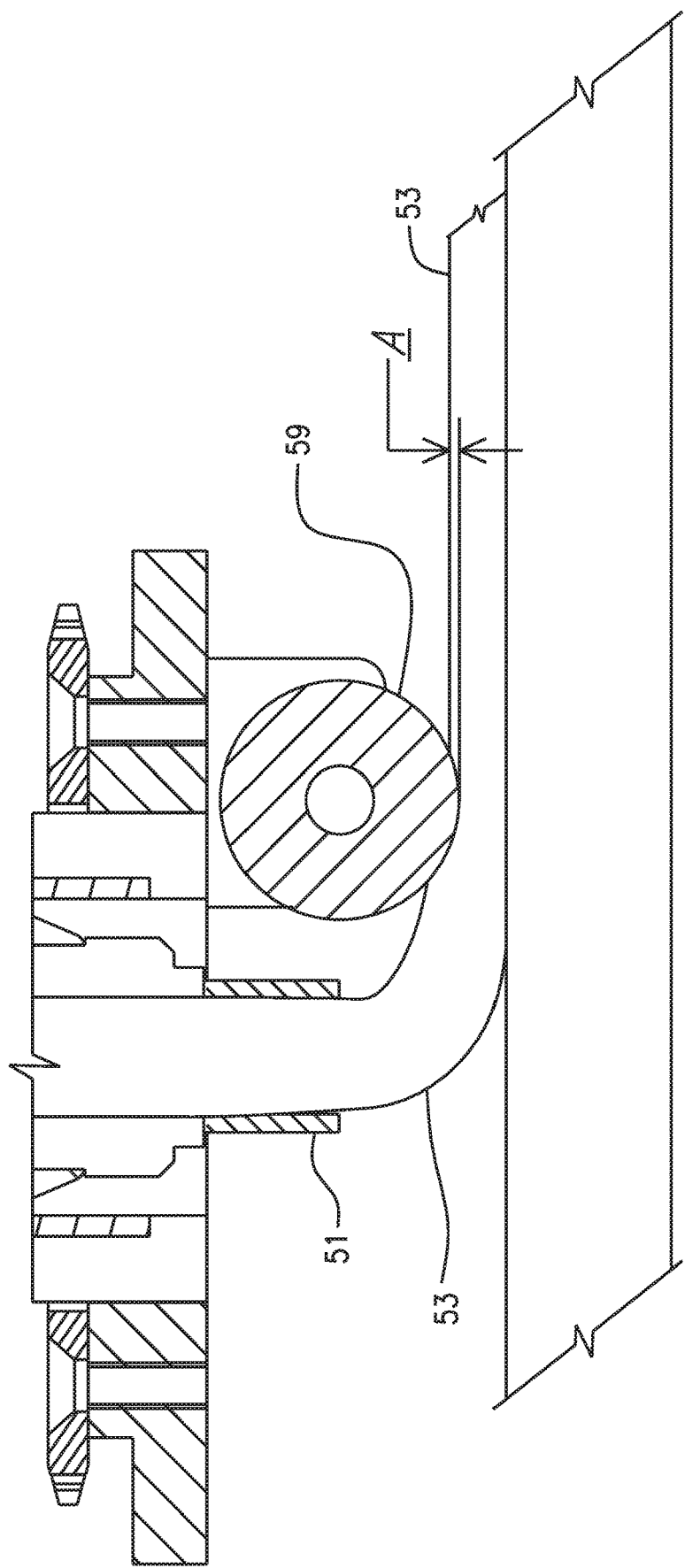
FIG. 4 is an enlarged cross-sectional view of an exemplary deposition head and compression roller assembly, illustrating the slight decompression of a deposited layer, which occurs immediately after the compression roller passes over the deposited bead of molten material.

With reference now to FIG. 4, there is illustrated a cross-sectional schematic representation of a flowable material (e.g., melted thermoplastic) extrusion and application system. During an additive manufacturing process, there is a slight decompression of the deposited layer 53, which occurs immediately after the compression roller 59 passes over the bead of flowable material (e.g., melted thermoplastic material). Such a decompression results in the surface of the final flattened layer rising up, and remaining slightly higher than the bottom of the compression roller 59. This decompression is best shown FIG. 4, where distance A illustrates a difference in height between the bottom apex of the compression roller 59, and the top of the decompressed material bead 53. Owing to this decompression, when the applicator head 43 rotates to execute a change in tool-path direction, the edges, as well as the outer regions, of the roller 59 tend to engage the surface of the final flattened layer, since it is slightly higher than the bottom apex of the roller, resulting in the roller gouging and/or dragging the deposited material during the transition.

Figure 5A:
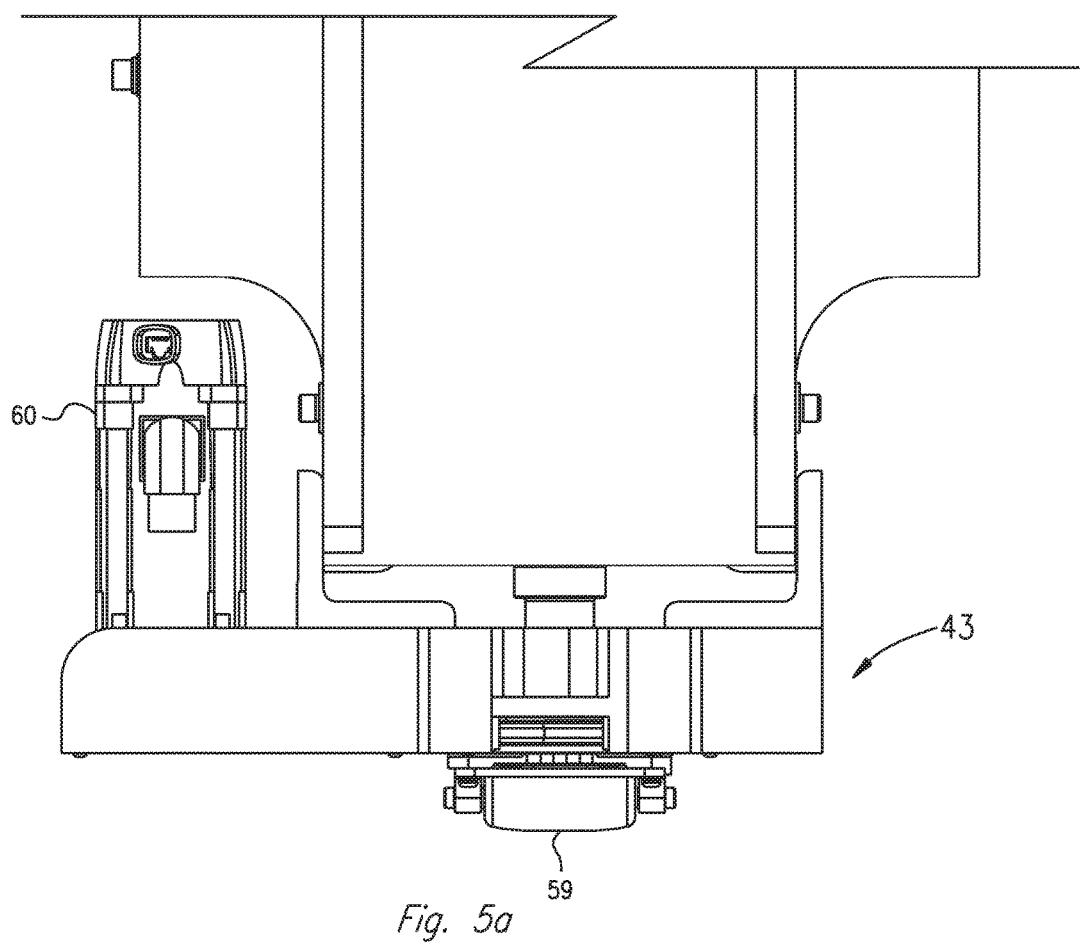
FIG. 5a is an enlarged plan view of an exemplary carrier and applicator assembly of the exemplary CNC additive manufacturing machine shown in FIG. 1.
Figure 5B:
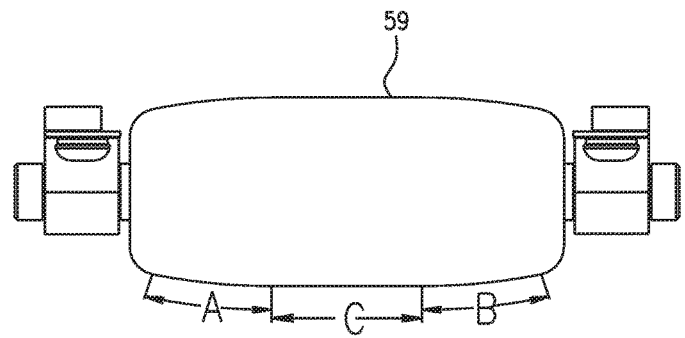
FIG. 5b is an enlarged plan view of an exemplary bead compression roller, illustrating the different surface features of the roller.

With reference now to FIGS. 5a and 5b, the surface-contour of compression roller 59 can be seen in both enlarged plan views. Compression roller 59 comprises a flat center portion C for engaging and flattening the deposited bead, with the outer extremities of said roller gradually tapering to the ends in a slight elliptical curve, as shown as portions A and B in FIG. 5b. The flat surface C of roller 59 provides smooth compression and bonding of the deposited material layer, while the gradually-curved outer surfaces facilitates destruction-free tracking along curved portions of the deposited layer, as well as during directional changes in the tool path.

In FIG. 5b, the surface features are annotated as A, B, and C for descriptive purpose. A and B show the elliptically-tapered outer segments of the roller, while C shows the flat middle feature of the roller. The gradual outer taper of roller 59 prevents the roller 59 from gouging and dragging molten thermoplastic material from the surface of the flattened layer when the roller is advanced in a non-linear direction (e.g., when the roller turns a corner) during the stratification process, as well as when depositing and compressing a bead of flowable material (e.g., melted thermoplastic) adjacent to a previously-deposited adjoining layer, which may still be molten. By comparison, a completely cylindrical compression roller (e.g., a roller without the tapered segments A and B depicted in FIG. 5b) would gouge and drag the material while navigating around corners and curves, as the entire roller surface would be engaged with the slightly-decompressed and raised material surface. Compression roller 59 smooths and bonds the layer with the flat portion of the roller, and the gradual tapering of the outer surfaces allows it to negotiate around the corners without producing objectionable surface imperfections.

Figure 6B:
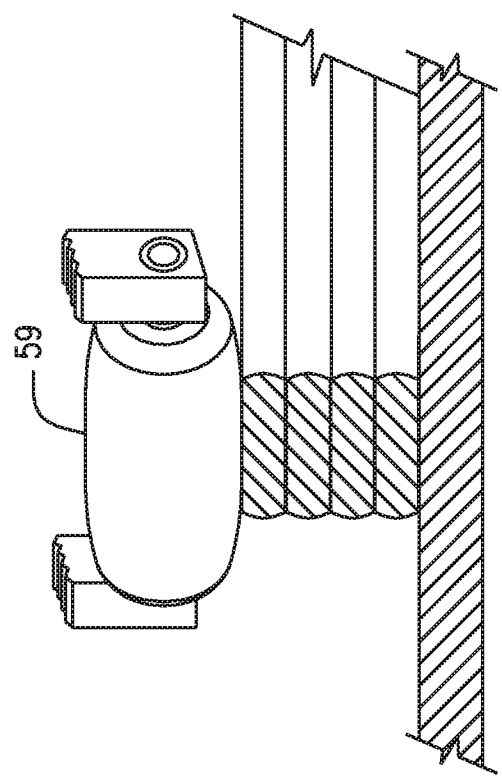
FIG. 6b is an enlarged cross-sectional perspective view of an exemplary material compression roller, with an elliptically tapered outer surface feature, executing a tool-path directional change.
Figure 6A:
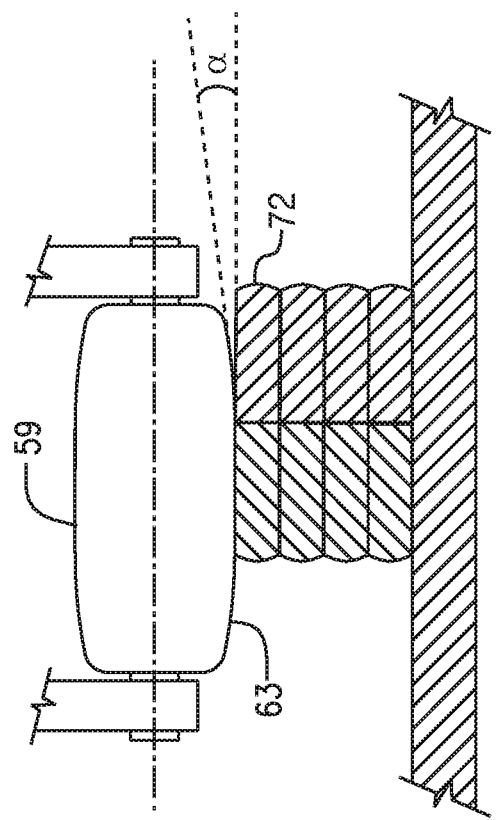
FIG. 6a is an enlarged cross-sectional view of an exemplary compression roller, with an elliptically tapered outer surface feature, compressing a molten material bead alongside a previously-deposited and compressed layer of material.

FIG. 6a, which depicts a cut-away end view of deposited strata, exemplifies the bead compression process, using the described compression roller 59 during the deposition of a bead of flowable material (e.g., melted thermoplastic) adjacent to a previously deposited and compressed bead. Tapered end 63 of the compression roller 59 does not substantially engage a previously deposited layer 72, and therefore has minimal or no effect on the surface of layer 72. In some embodiments, the tapered end 63 of the compression roller 59 may be tapered at both ends, as shown in FIG. 6a. In other embodiments, compression roller 59 may include only a single tapered end 63. In some embodiments, the tapered end 63 may be angled "α" approximately 1 to 15 degrees relative to the surface of the center, flat portion of roller 59. In some other embodiments, tapered end 63 may include a non-linear relief (e.g., the relief is not a straight line, but a taper curving away from the radially outermost surface of compression roller 59).

With reference now to FIG. 6b, which is a cut-away view of strata deposited in two directions, there is shown, an exemplary view of the compression roller 59, executing a change of direction in the bead deposition process. The tapered portion 63 of roller 59 does not engage the material on the adjoining side of the article, because roller 59 is slightly tapered to prevent any substantial contact with the surface of that side of the deposited strata of previously deposited layers. After deposition of a flowable material (e.g., melted thermoplastic) on surface 27, as shown in FIG. 3, and while the topmost layer of deposited strata 72, as shown in FIG. 6a, is cooling (e.g., the melted material has not completely solidified), compression roller 59 is used to flatten deposited strata 72 to create a uniform deposited layer. In some examples, however, compression roller 59 must be used to flatten deposited strata 72 in a non-linear manner (e.g., when navigating a corner or curve). In such instances, compression roller 59 is used to compress the unsolidified top-most layer of deposited strata 72, while navigating around the corner or curve, such that any flowable material of the top most layer of deposited strata 72 is not gouged and/or dragged. Moreover, when roller 59 navigates a corner or curve, the roller 59 would be engaged with the slightly-decompressed and raised material surface, as previously described above. While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

We claim:

1. An additive manufacturing method, comprising:
   depositing a layer of a flowable material on a surface from a nozzle;
   displacing the nozzle along a path of travel;
   translating a roller along the path of travel of the nozzle; and
   compressing the layer of the flowable material with the roller, wherein the roller comprises:
      a flat center portion extending in an axial direction of the roller, the flat center portion having a constant diameter; and
      opposed end portions extending in the axial direction of the roller, wherein each end portion extends outwardly from the flat center portion, and wherein a radially outermost surface of each end portion is angled relative to a rotational axis of the roller.

2. The additive manufacturing method of claim 1, wherein the radially outermost surface of each end portion tapers away from a surface of the flat center portion and towards the rotational axis of the roller.

3. The additive manufacturing method of claim 1, wherein the radially outermost surface of each end portion extends at an angle of approximately 1 degree to 15 degrees away from a surface of the flat center portion.

4. The additive manufacturing method of claim 1, wherein each end portion comprises a diameter that varies over a rotational axis of each end portion.

5. The additive manufacturing method of claim 1, wherein the flat center portion and the end portions are formed integrally.

6. The additive manufacturing method of claim 1, wherein the flowable material is a thermoplastic material.

7. The additive manufacturing method of claim 1, wherein the layer of the flowable material is a first layer of the flowable material, and wherein the manufacturing method further includes:
   depositing a second layer of the flowable material adjacent to the first layer; and
   compressing the second layer of the flowable material with the roller.

8. The additive manufacturing method of claim 7, wherein the first layer of flowable material partially decompresses after being compressed with the roller, and wherein the first one of the radially outermost surfaces is angled away from the partially decompressed material when the roller compresses the second layer.

9. The additive manufacturing method of claim 1, wherein the compressing the layer of the flowable material with the roller is performed on a portion of the layer that is deposited on the surface, and wherein the surface is provided on a worktable.

10. The additive manufacturing method of claim 1, wherein the constant diameter of the flat center portion is a largest diameter of an entirety of the roller.

11. An additive manufacturing method, the method comprising:
depositing a layer of a flowable material on a surface;
translating a roller along a path of travel; and
compressing the layer of the flowable material with the roller, wherein the roller comprises:
a cylindrical center portion extending in an axial direction of the roller, the cylindrical center portion having a first diameter; and
opposed first and second end portions extending in the axial direction of the roller, the opposed first and second end portions having second and third diameters respectively, wherein the first diameter is greater than the second and third diameters.

12. The additive manufacturing method of claim 11, wherein the first and second end portions each taper away from a surface of the flat center portion and toward the rotational axis of the roller.

13. The additive manufacturing method of claim 11, wherein the radially outermost surface of each of the first and second end portions extends at an angle of approximately 1 degree to 15 degrees away from a surface of the cylindrical center portion.

14. The additive manufacturing method of claim 11, wherein the cylindrical center portion and first and second end portions are formed integrally.

15. The additive manufacturing method of claim 11, wherein the layer of the flowable material is a first layer of the flowable material, and wherein the manufacturing method further includes:
depositing a second layer of the flowable material adjacent to the first layer of the flowable material; and
compressing the second layer of the flowable material with the roller.

16. The additive manufacturing method of claim 15, wherein, during the compressing the second layer with the roller, the first end portion includes a surface that is spaced above the first layer.

17. An additive manufacturing method, the method comprising:
depositing a first layer of a flowable molten material on a surface from a nozzle;
displacing the nozzle along a path of travel;
translating a roller along the path of travel of the nozzle;
compressing the first layer of the flowable molten material on the surface with the roller including:
a cylindrical center portion extending in an axial direction of the roller, the cylindrical center portion having a constant diameter; and
opposed end portions extending in the axial direction of the roller, wherein each end portion extends from the cylindrical center portion;
depositing a second layer of the flowable molten material on the surface at a location adjacent to the first layer; and
compressing the second layer of the flowable molten material with the cylindrical center portion of the roller.

18. The additive manufacturing method of claim 17, wherein the compressing the second layer is performed while navigating the roller along a curved path.

19. The additive manufacturing method of claim 17, wherein the cylindrical center portion smooths the first layer of the flowable molten material while compressing the first layer of the flowable molten material.

20. The additive manufacturing method of claim 17, wherein the compressing the second layer of the flowable molten material with the roller is performed on a portion of the second layer that is deposited on the surface, and wherein the surface is provided on a worktable.

* * * * *